Aug. 21, 1956  B. COPPING  2,759,593
CONVEYOR FOR BOTTLE CRATE UNLOADING MACHINE
Original Filed March 29, 1949  12 Sheets-Sheet 1
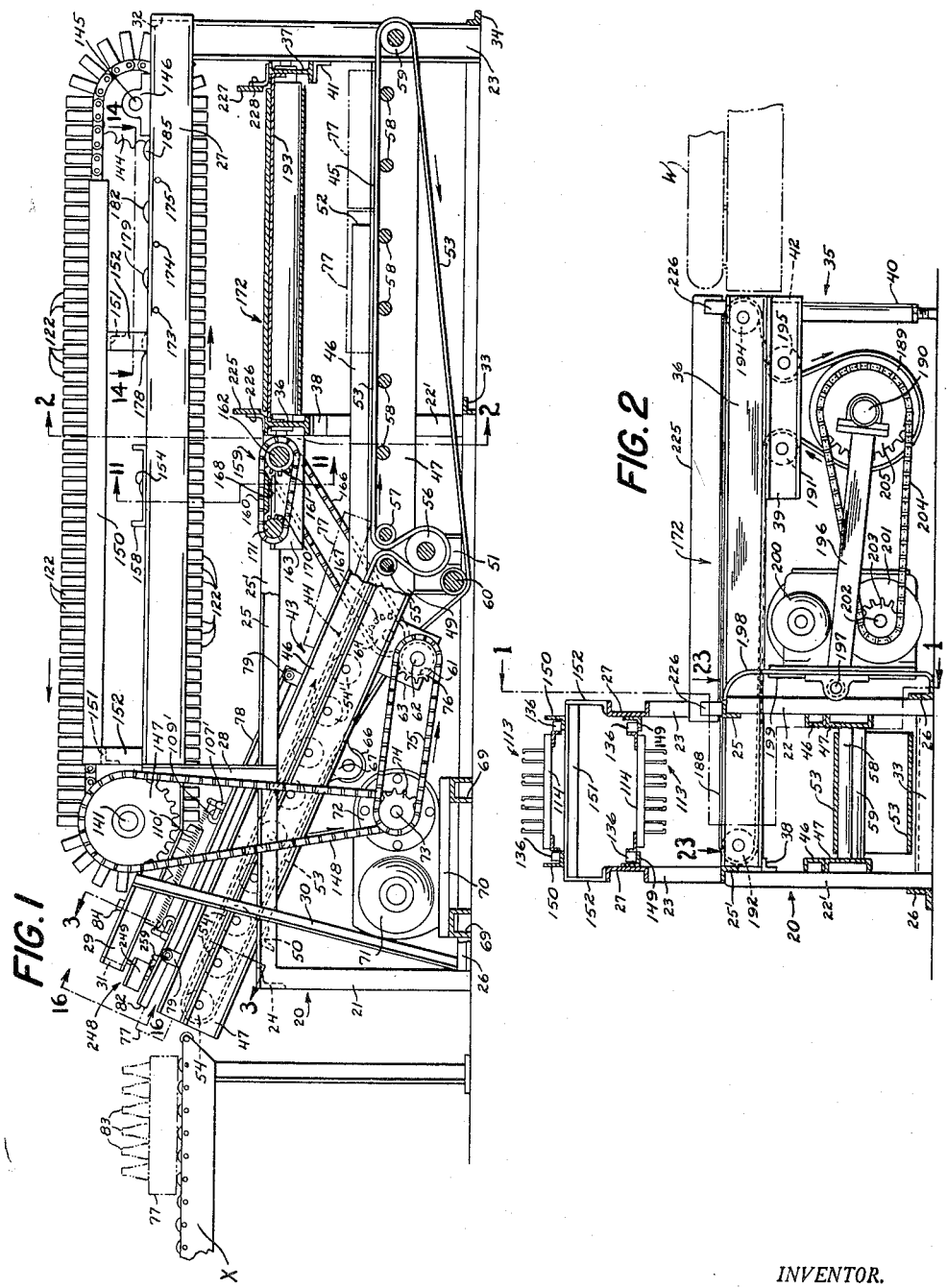
INVENTOR.
BRIAN COPPING
BY
ATTYS.

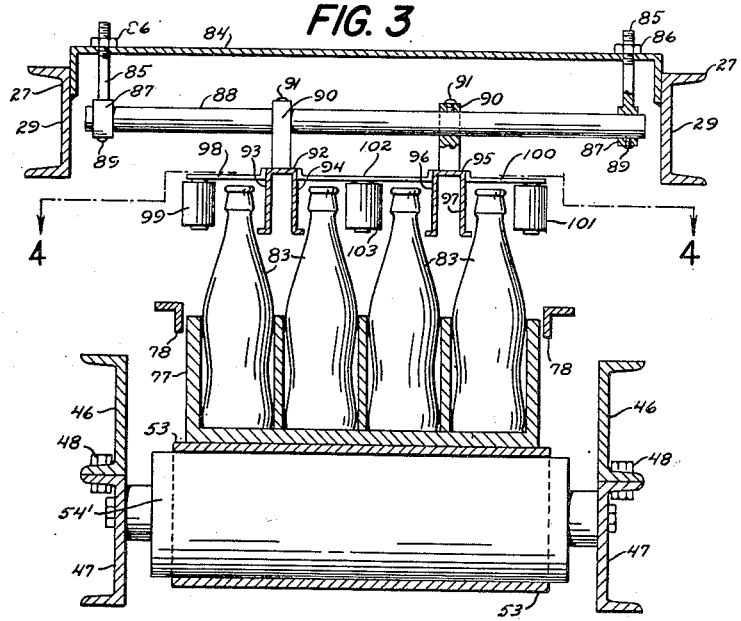
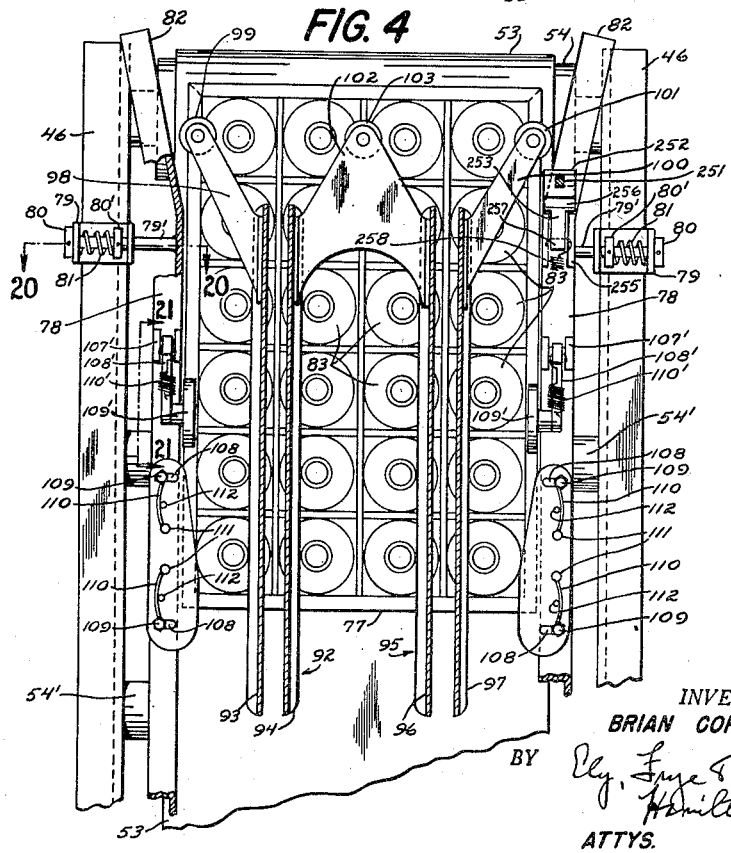

Aug. 21, 1956  B. COPPING  2,759,593
CONVEYOR FOR BOTTLE CRATE UNLOADING MACHINE
Original Filed March 29, 1949  12 Sheets-Sheet 3
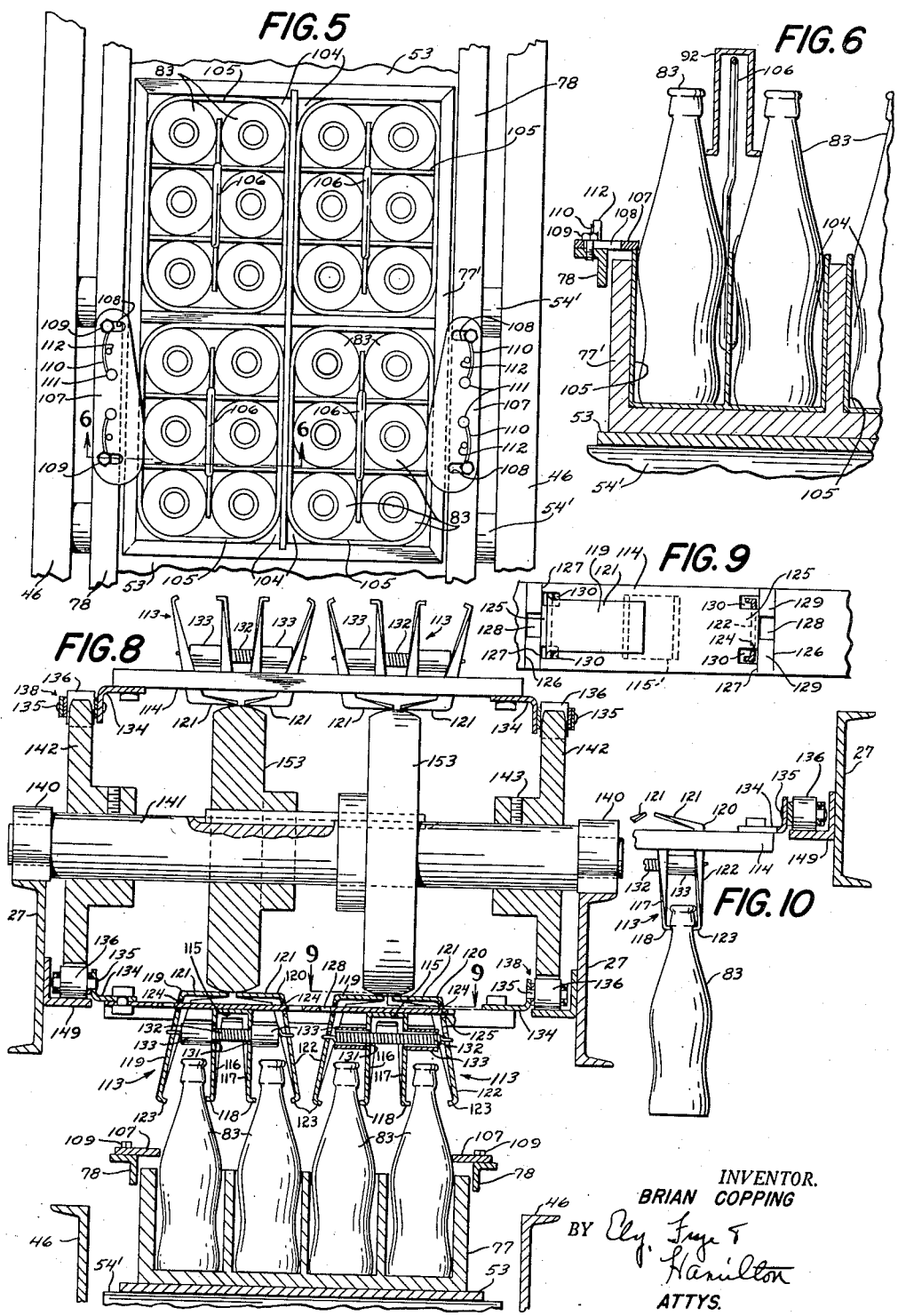
INVENTOR.
BRIAN COPPING
BY
ATTYS.

INVENTOR.
BRIAN COPPING
BY
ATTYS.

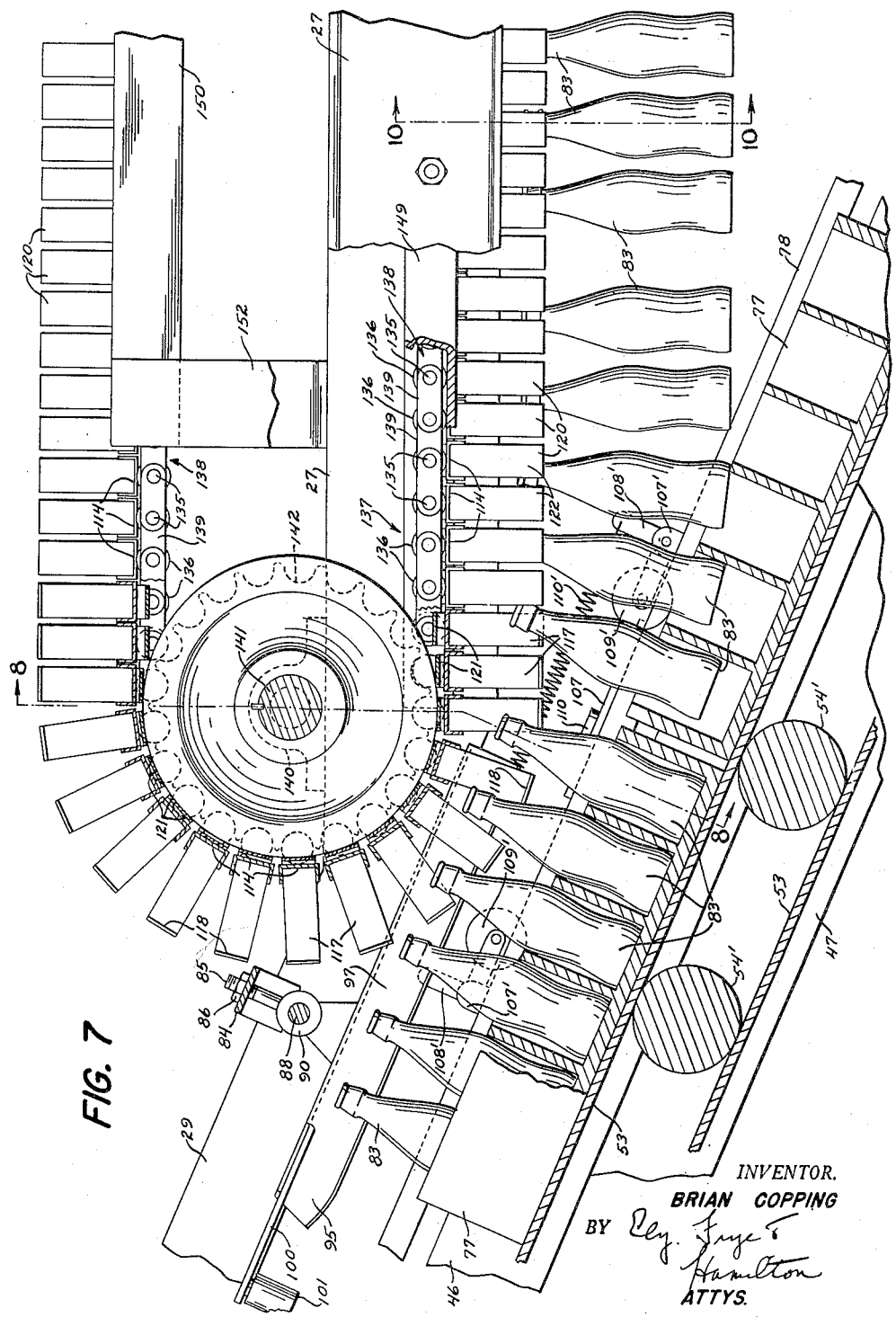

Aug. 21, 1956  B. COPPING  2,759,593
CONVEYOR FOR BOTTLE CRATE UNLOADING MACHINE
Original Filed March 29, 1949  12 Sheets-Sheet 6

INVENTOR.
BRIAN COPPING
BY Ely, Frye &
Hamilton
ATTYS.

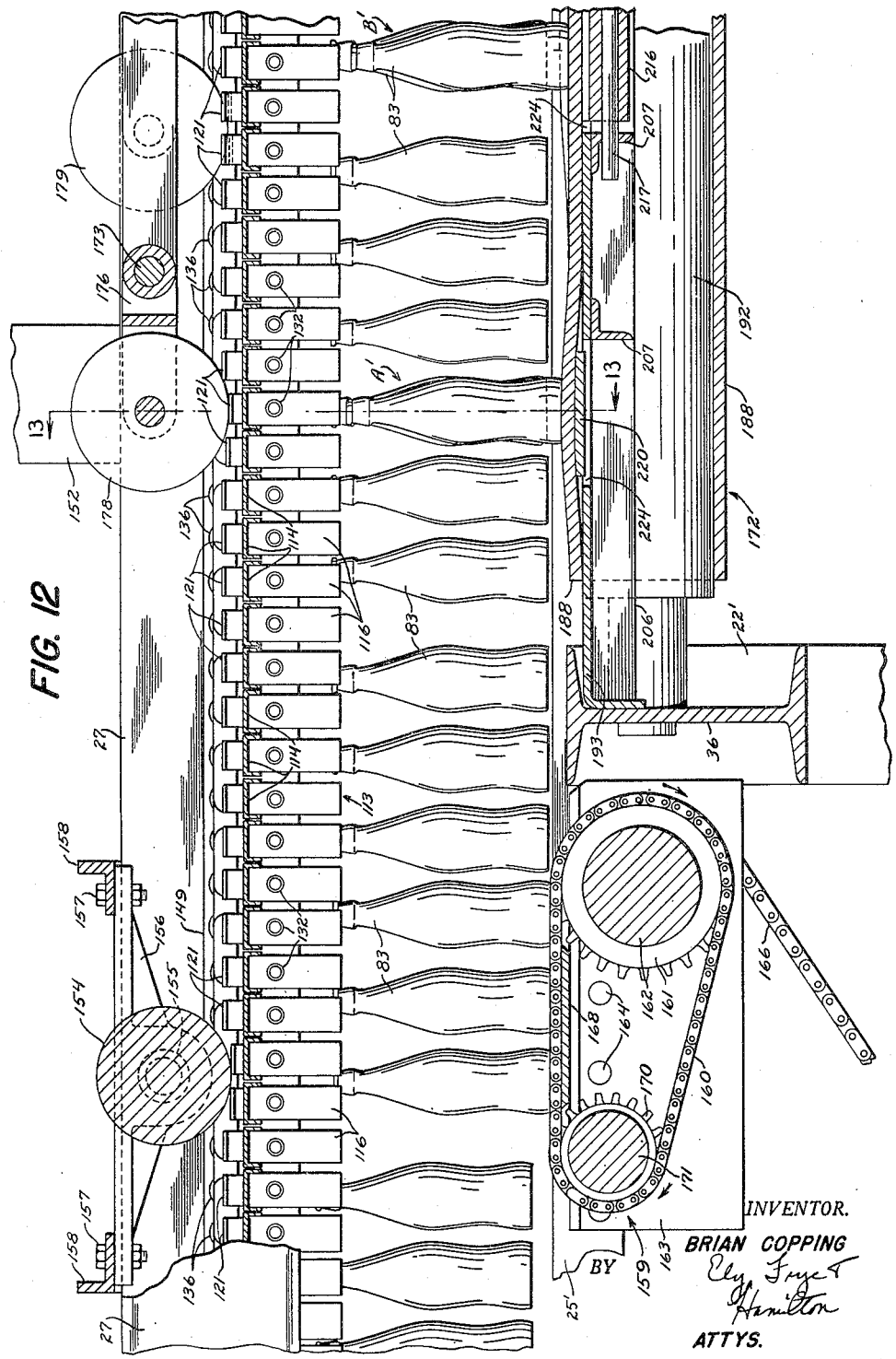

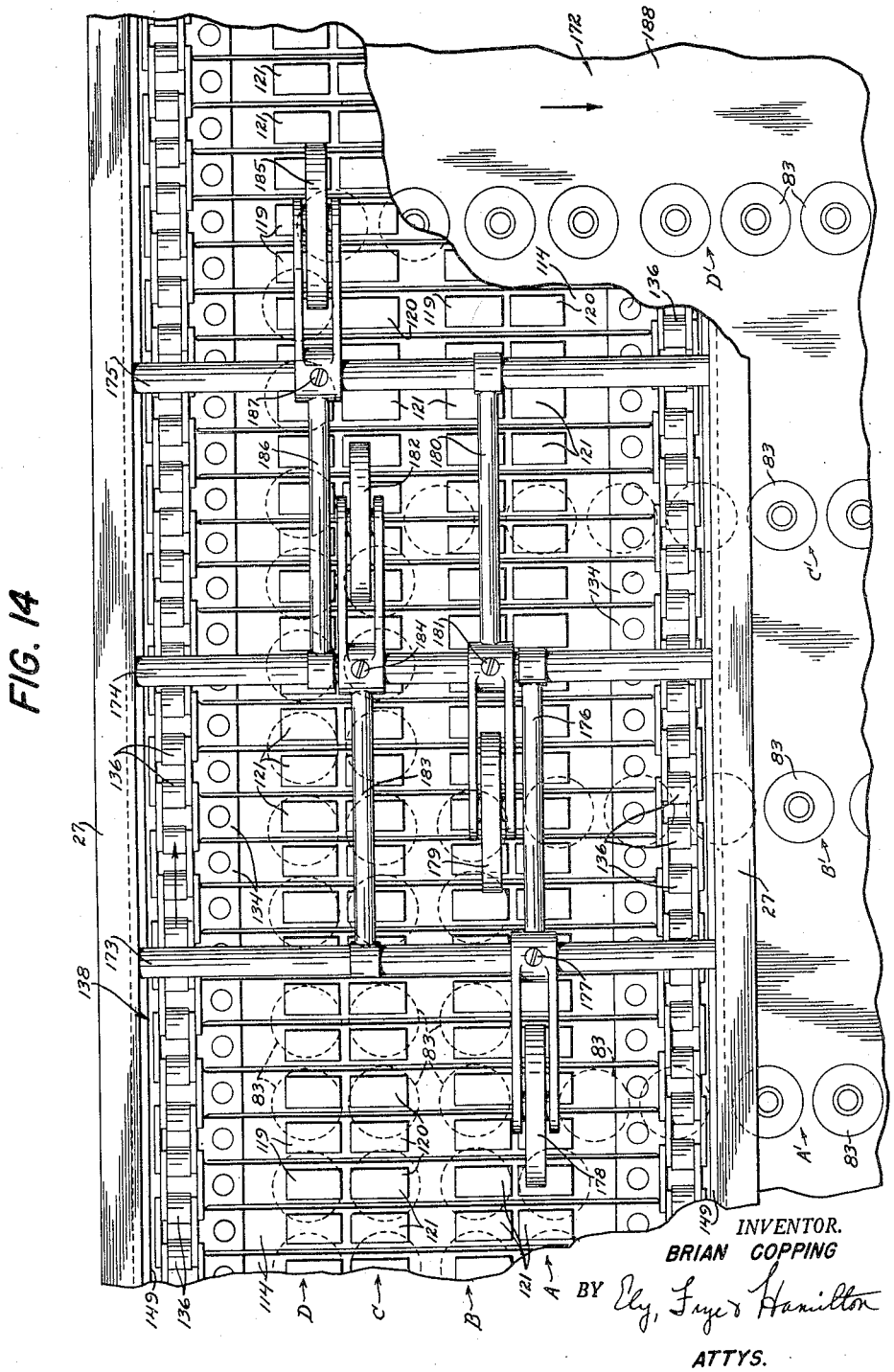

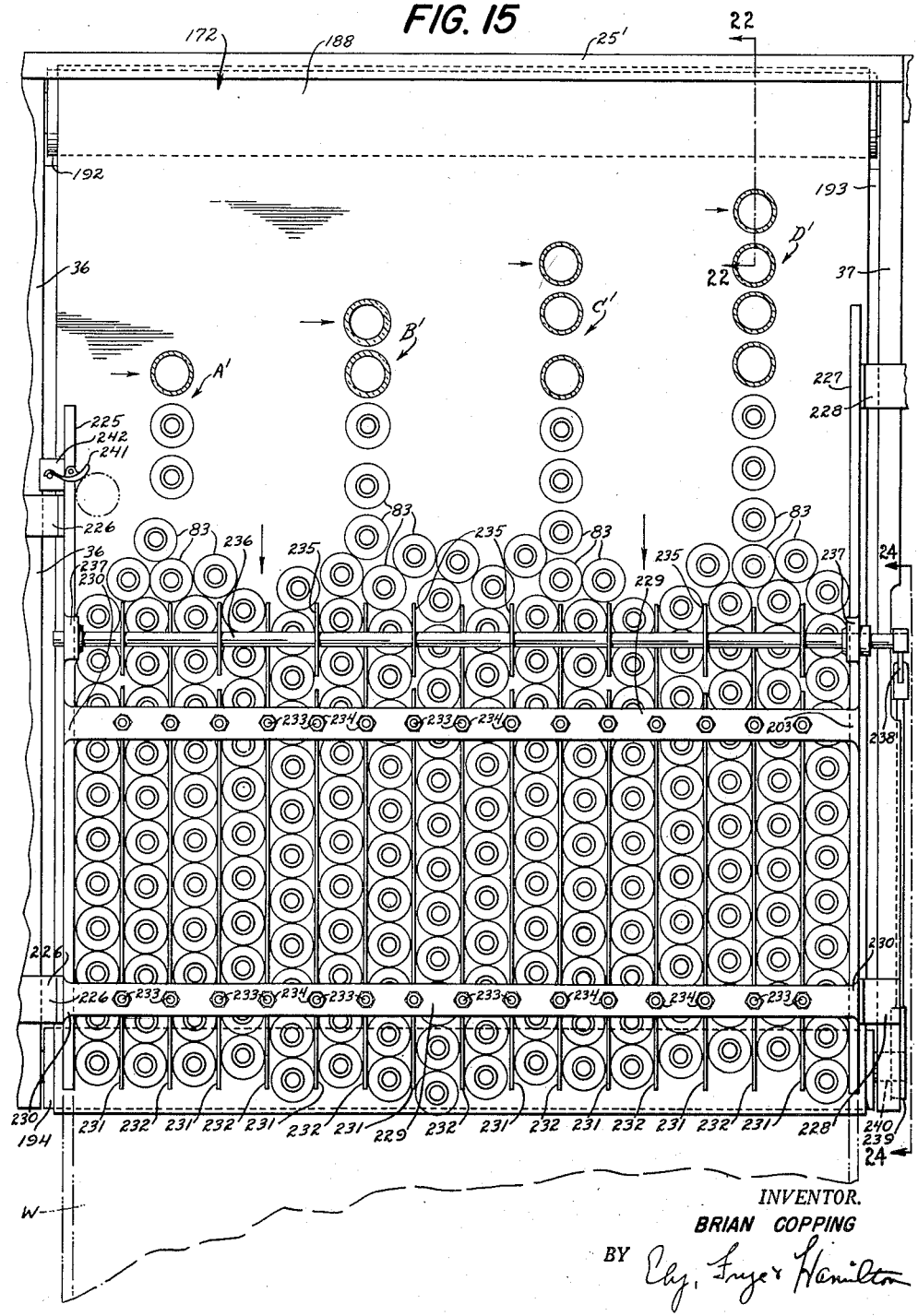

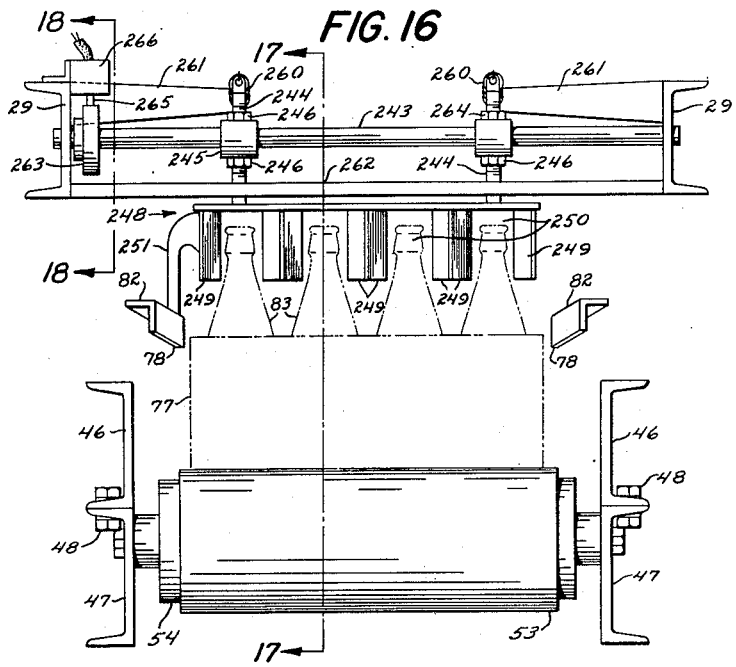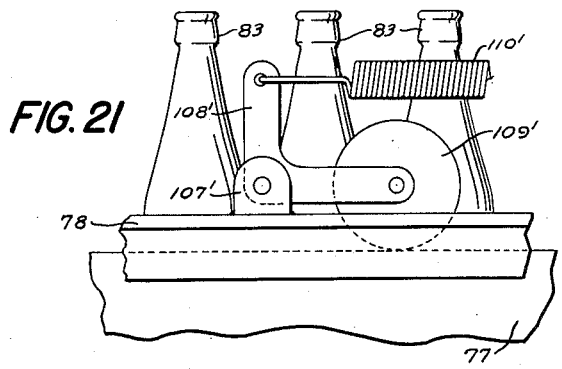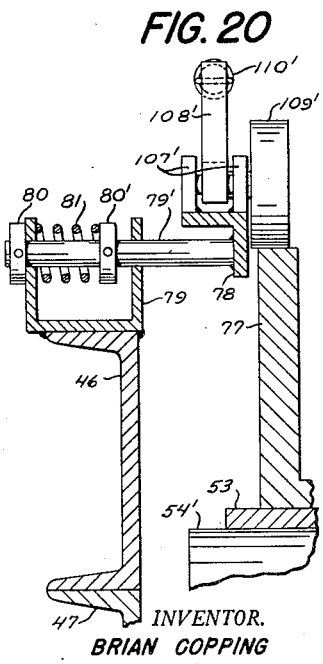

Aug. 21, 1956   B. COPPING   2,759,593
CONVEYOR FOR BOTTLE CRATE UNLOADING MACHINE
Original Filed March 29, 1949   12 Sheets-Sheet 11

INVENTOR.
BRIAN COPPING
BY *Ely, Frye & Hamilton*
ATTYS.

Aug. 21, 1956 B. COPPING 2,759,593
CONVEYOR FOR BOTTLE CRATE UNLOADING MACHINE
Original Filed March 29, 1949 12 Sheets-Sheet 12

INVENTOR.
BRIAN COPPING
BY Ely, Frye & Hamilton
ATTYS.

United States Patent Office 2,759,593
Patented Aug. 21, 1956

2,759,593
CONVEYOR FOR BOTTLE CRATE UNLOADING MACHINE

Brian Copping, Cuyahoga Falls, Ohio, assignor to Atkron, Inc., Cuyahoga Falls, Ohio, a corporation of Ohio Original application March 29, 1949, Serial No. 84,025, now Patent No. 2,696,927, dated December 14, 1954. Divided and this application June 4, 1954, Serial No. 436,905

7 Claims. (Cl. 198—179)

This invention relates to a machine for unloading empty bottles from crates, and more particularly it relates to a completely automatic machine for unloading empty bottles, for example, bottles of the soft drink or beer type, from crates wherein the bottles extend above the crates, and transferring such bottles to another device, such as a bottle washing machine. This application is a division of my copending application Serial No. 84,025, filed March 29, 1949, now Patent No. 2,696,927, granted December 14, 1954.

It has long been desirable to provide a continuously operating machine for unloading empty bottles from crates and delivering them to washing machines so that an adequate supply of bottles for the washing machines is always available, and many attempts have been made to furnish such devices. However, none of these prior devices with which I am familiar has been successful, due sometimes to the high rate of breakage of the bottles by the machine, sometimes to faulty mechanism or faulty operation of the mechanism, and sometimes for other reasons.

One of the objects of the present invention is to provide a machine which will rapidly remove bottles from their crates and deliver them, with a minimum of breakage, to a bottle washing machine. My machine includes an inclined conveyor which carries the crates with their bottles into the path of a plurality of aligned, continuously moving bottle gripping fingers, whereby all the bottles carried in the first row transversely of a crate are simultaneously engaged by said fingers and removed from the crate, with successive rows of bottles being engaged by successively aligned fingers until the crate is empty, after which the empty crate is conveyed to any suitable point out of the path of the operating mechanism of the machine. By continually feeding crates with bottles to the inclined conveyor, the removal of bottles from the crates, one transverse row at a time, is continuous until all bottles have been removed and the empty crates passed on.

Another object is to provide novel bottle gripping fingers which are properly aligned transversely and longitudinally of the machine, and to provide suitable mechanism to operate the fingers at the proper time to lift the bottles from the crates, as well as at the proper time to release the bottles at selected points remote from the pick-up station.

In prior machines with which I am familiar it has been customary to arrange each finger so that it is intended to pick up a selected bottle, and if for any reason the bottle and finger are not in proper alignment at the time the pick-up is to be made, the bottle will remain in the crate and pass on with the latter. It is a further object of this invention to obviate the necessity of assigning any particular finger to pick up any particular bottle, and yet to be sure that all bottles are picked up by the fingers. This is accomplished by proper and relatively close spacing of the fingers in longitudinal alignment so that a bottle may be picked up by one finger if properly aligned therewith, but if the alignment of bottle and finger is improper so that only a portion of a bottle is engaged by the finger, the next following finger will quickly engage a portion of the bottle and the latter will be carried between the two fingers.

With bottles of the type primarily intended for handling with my machine, there are two areas that may be engaged by the fingers. One is under the bead or lip formed at the mouth of the bottle, while the other is under the bulbous neck portion of the bottle, known as the "re-inforcement," which is below said bead. When bottles are engaged by the fingers under the bulbous neck portion, subsequent permanent release of the bottles may require them to drop too far to remain upright, and under such conditions it is a further object of this invention, before permanent release of the bottles, to permit temporary release thereof long enough for the fingers to re-engage the bottles under the bead portion at the bottle mouth. When the bottles are thereafter permanently released the distance they are required to drop will be materially reduced.

A further object is to provide a machine of the character referred to wherein after the bottles have been picked up by the fingers they are carried by the fingers to discharge stations located above a transversely operating conveyor arranged below the fingers and adapted to carry the bottles to a bottle washing machine or other apparatus.

A further object is to provide a different discharge station for each longitudinal row of bottles carried by the fingers, all of which stations are above said transverse conveyor and all of which stations are spaced from each other, whereby bottles discharged at each station will move with said transverse conveyor in different, substantially parallel, vertical rows, so that the bottles in each row will interfere with the movement of bottles in any other row.

A further object is to elevate or tilt portions of the transverse conveyor directly under the bottle discharge stations, so that any tendency for the bottles to fall over as they engage the transverse conveyor will be overcome.

A further object is to provide guide means for said bottles associated with said transverse conveyor so that after said bottles pass from under said fingers they are moved in parallel rows to a washing machine or other apparatus.

A further object is to provide agitating means at the entrance to said guide means to prevent the bottles from clogging or blocking said entrance.

A further object is to provide a safety device in the form of a microswitch located in the path of said transverse conveyor which will be operated by the bottles to stop the movement of the bottle carrying fingers in the event so many bottles accumulate on the transverse conveyor as to interfere with the normal movement of the bottles from the fingers to the washing machine.

A further object is to provide means for guiding the bottles and crates as they are carried by the inclined conveyor into position to be engaged by the fingers, and to also provide means for insuring an upright position of the bottles at the time they are engaged by the fingers.

Occasionally a bottle is found in upside down position in a crate, and if allowed to pass into the machine in such position, it may seriously damage the mechanism, particularly the gripping fingers. It is a further object of this invention to provide safety mechanism including a microswitch which will not interfere with passage of bottles in upright position, but which will obstruct the passage of any upside down bottle and stop further operation of the machine until such bottle is removed or properly positioned in the crate.

In most instances the crates passing through my machine contain twenty-four permanent compartments, each of which carries a bottle. However, there is in use today a crate having no permanent compartments of bottle size, but which has four equal size larger compartments, each of which is adapted to receive one removable six-bottle carrier that fits snugly in the crate so that there are four of the six-bottle carriers and still twenty-four bottles in the crate. Each of these carriers usually has a permanent handle portion that extends above the tops of the bottles, which handles constitute possible elements of interference with the machine, and the six-bottle carriers may have a tendency to lift out of the crate with the bottles as the bottles are lifted. In my machine, however, it is a further object to provide means for guiding and holding these handle portions so that they not only do not interfere with the operation of the machine, but may be utilized to prevent the carriers from being lifted out of the crates. Additional means are also provided to engage the top of the side walls of the carriers to hold the carriers in the crates as the bottles are lifted therefrom by the fingers.

A further object is to synchronize the speeds of the various conveyors and finger mechanisms so that the passage of bottles through the machine will be continuous and without interference from the time the bottles are removed from their crates until they are delivered to the washing machine.

Other objects and advantages will become apparent from the following description taken in conjunction with the accompanying drawings.

In the drawings:

Fig. 1 is a partial side elevation and partial section of the machine taken substantially on line 1—1 of Fig. 2, Fig. 2 is a partial front elevation and partial section taken substantially on line 2—2 of Fig. 1, Fig. 3 is an enlarged fragmentary section taken substantially on line 3—3 of Fig. 1, Fig. 4 is a similar section taken substantially on line 4—4 of Fig. 3, Fig. 5 is a view similar to Fig. 4 with parts of the machine removed for clarity, and showing four six-bottle carriers arranged with their bottles in one of the crates, Fig. 6 is an enlarged fragmentary section taken substantially on line 6—6 of Fig. 5 with some parts in elevation, Fig. 6a is a view similar to Fig. 6 showing a modified form of six-bottle carriers, Fig. 7 is an enlarged side elevation of the front end of the machine with parts broken away and shown in section to better illustrate the operation of the fingers in lifting the bottles from the crates, Fig. 8 is a section taken substantially on line 8—8 of Fig. 7, Fig. 9 is an enlarged fragmentary plan view of one set of two fingers taken substantially on line 9—9 of Fig. 8, Fig. 10 is a fragmentary section taken substantially on line 10—10 of Fig. 7, Fig. 11 is a similar enlarged section taken substantially on line 11—11 of Fig. 1, Fig. 12 is a section taken substantially on line 12—12 of Fig. 11, with some parts shown in elevation, Fig. 13 is a fragmentary section taken substantially on line 13—13 of Fig. 12, Fig. 14 is an enlarged partial plan taken substantially on line 14—14 of Fig. 1, Fig. 15 is a partial plan showing the transverse conveyor with bottles thereon and a partial section taken substantially on line 15—15 of Fig. 13, Fig. 16 is an enlarged fragmentary front elevation showing the safety mechanism for stopping the machine if an upside down bottle tries to enter the machine.

Figure 24:
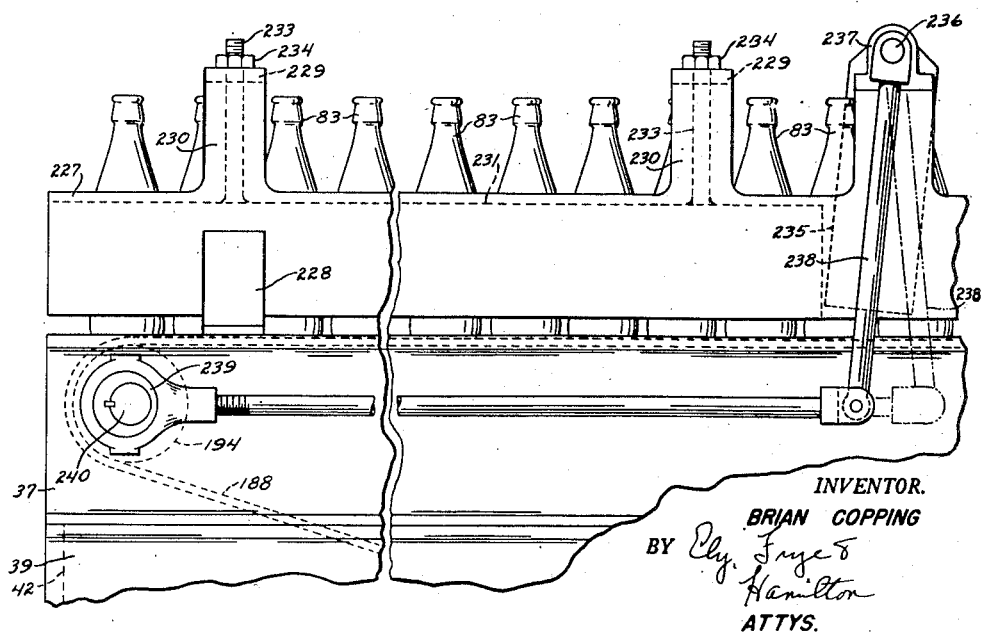
Figure 22:
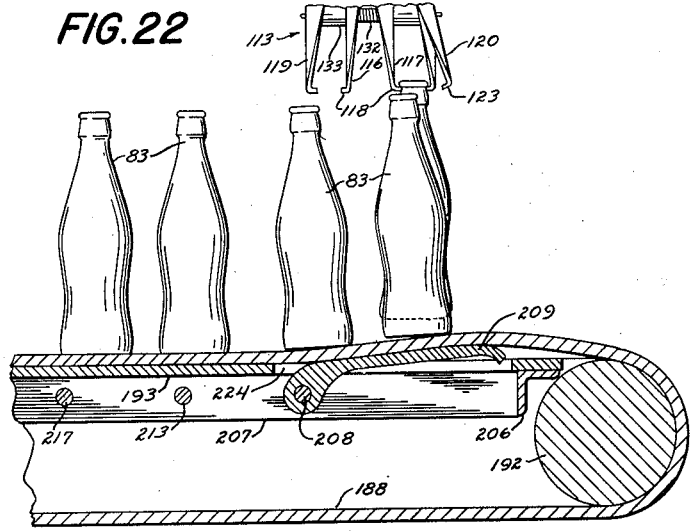
Figure 23:
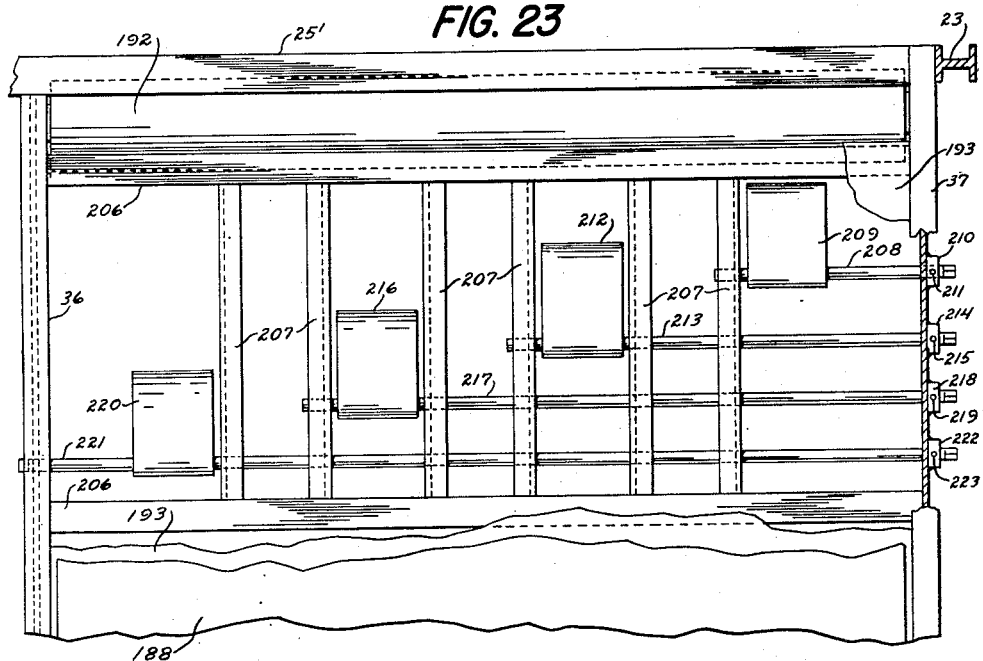

Fig. 20 is an enlarged fragmentary section taken substantially on line 20—20 of Fig. 4, Fig. 21 is an enlarged side elevation of a portion of the machine taken from the location indicated by line 21—21 of Fig. 4, Fig. 22 is an enlarged fragmentary section taken substantially on line 22—22 of Fig. 15, Fig. 23 is an enlarged plan of the tilting mechanism for the transverse conveyor taken substantially on line 23—23 of Fig. 2, with the transverse conveyor removed, and Fig. 24 is an enlarged side elevation of a portion of the machine taken from the location indicated by line 24—24 of Fig. 15.

Referring to the drawings the numeral 20 designates as a whole, a generally rectangular frame for the machine, comprising a pair of spaced, front vertical supports 21, a pair of intermediate, spaced vertical supports 22 and 22', and a pair of spaced, rear vertical supports 23 preferably in the form of I-beams and larger than the other supports, all of which supports are adapted to rest on a floor or the like of a building in which the machine is used.

Supports 21 are connected at their upper ends by a transverse frame member 24, while one of the supports 21 is also connected at its upper end with the front end of a longitudinal frame member 25, L-shaped in this instance, the rear end of which is connected to the upper end of support 22. The other support 21 is connected at its upper end with the front end of a longitudinal frame member 25' arranged parallel with member 25, but member 25' in addition to being connected to the upper end of support 22' is also connected at its rear end to one of the rear supports 23.

The lower end of each support 21 is also connected with the front end of a lower longitudinal frame member 26, also preferably L-shaped, with the rear end of each member 26 being connected to the lower end of one of the supports 23, while each member 26 is connected intermediate its ends to the lower ends of the supports 22 and 22' respectively.

As will be observed from Figs. 1 and 2, rear supports 23 extend above the horizontal plane in which lie the upper longitudinal frame members 25 and 25', and their upper ends support the rear ends of a pair of spaced, longitudinal U-beams 27. The latter beams extend parallel with the frame members 25 and 25', and intermediate their ends are supported on spaced vertical supports 28 which extend upwardly from frame members 25 and 25'. Adjacent their front ends, beams 27 are reduced in width and are inclined upwardly, as indicated at 29. Additional, inclined supports 30 for the beams 27 extend upwardly from the lower frame members 26, and the front ends of beams 27 are connected together by a transverse member 31. The rear ends of beams 27 may be connected by a transverse member 32, and the entire frame may be additionally braced by lower transverse members 33 and 34.

At substantially a right angle to the frame 20 and below the rear portions of the beams 27, a second generally rectangular frame, indicated as a whole by the numeral 35, is connected to the frame 20. As shown in Figs. 1 and 2, frame 35 comprises a pair of spaced, parallel I-beams 36 and 37, with beam 36 being connected at one end to frame member 25' by welding or other suitable means and being connected to the upper end of support 22' through a bracket 38 secured to the latter support. Beam 36 is suitably connected intermediate its ends to the upper end of support 22, while its other end has a section of I-beam 39 bolted or welded thereto so that an adjustable supporting leg 40 may be secured to the lower surface of section 39 in a manner to support the upper surface of beam 36 in substantially the same horizontal plane as the upper surface of frame members 25 and 25'.

One end of beam 37 is also suitably connected to frame member 25' and is secured to each of the rear supports 23 by means of brackets 41 (one of which is shown in Fig. 1) carried by each support 23. The other end of beam 37 has a section of I-beam similar to section 39 secured thereto and is supported on an adjustable leg similar to leg 40. The outer ends of the sections 39 may be connected by a transverse member 42.

Mounted in the frame 20 is a conveyor, indicated as a whole by the numeral 43, for bottle crates, which has an inclined portion 44 and a horizontal portion 45. The frame for this conveyor comprises two parallel, spaced sets of upper and lower U-beams 46 and 47, the beams in each set being joined together by spaced bolts 48 (Fig. 3) or by welding, and being arranged on opposite sides of the machine, as indicated in Fig. 3. As more clearly shown in Fig. 1, each set of beams 46 and 47 has an inclined portion substantially parallel with the inclined portions 29 of beams 27, with its upper end extending forwardly of the vertical plane in which lie the supports 21, and above the plane in which lie the frame members 25 and 25'. From their upper ends the inclination of each set of beams 46 and 47 continues downwardly as indicated in Fig. 1 until near the base of the frame 20 where each set of beams changes its direction and continues in a horizontal direction to the rear end of frame 20. The inclined and horizontal portions of each set of beams 46 and 47 are formed integral, preferably by cutting straight lengths of the beams intermediate their ends and welding them together in the area indicated by the numeral 49 to form the desired angle for the inclined portions, which in this instance is about 23° from the horizontal.

The two sets of beams 46 and 47 are supported adjacent their front ends on a cross member 50 to which they may be welded, and which cross member may be welded or otherwise suitably secured between the frame members 25 and 25'. Intermediate their ends these sets of beams are supported on plates 51 to which they may be suitably secured, and which plates in turn are suitably secured to the lower frame members 26. The rear ends of each beam 47 are suitably secured to the rear supports 23, while each beam 46 terminates short of the rear end of beams 47, as indicated at 52. If desired, additional cross bracing members (not shown) may be secured between the two sets of beams, as will be understood.

Associated with the conveyor frame is an endless belt conveyor 53 which passes around an idler roller 54, journaled for rotation between beams 47 near the upper end of the conveyor frame. The upper run of the belt conveyor is to the right as viewed in Fig. 1, and it next engages in inclined position a plurality of similar idler rollers 54' journaled for rotation between beams 47, then passes around a smaller idler roller 55 journaled for rotation between beams 47, after which it passes downwardly and under a larger idler roller 56 journaled for rotation between the supporting plates 51, and upwardly over another idler roller 57 journaled for rotation between beams 47, so that it may continue its run in a horizontal position. During its upper horizontal run, the belt conveyor next engages a plurality of spaced, small idler rollers 58 which are journaled for rotation between beams 47, after which it passes around an idler roller 59 journaled for rotation between the rear supports 23 and begins its lower run in the opposite direction.

During its lower run, the belt conveyor passes under an idler roller 60 mounted for rotation between the plates 51, then between a driven roller 61, the shaft 62 of which is journaled for rotation between a pair of depending brackets 63 carried by the beams 47, and a roller 64, the shaft 65 of which is journaled for rotation between the beams 47. Next the belt conveyor passes over an idler roller 66 journaled for rotation between a pair of brackets 67 depending from the beams 47, and continues in inclined position back to roller 54.

Adjacent the front of the frame 20, a pair of transverse base members 69 are suitably secured between the lower frame members 26. These base members have secured thereto a platform 70 that supports a motor 71 and a gear reduction unit 72. A shaft 73 which is driven by the motor carries an outer sprocket 74 mounted for rotation with the shaft, and an endless drive chain 75 engages this sprocket as well as a sprocket 76 mounted on shaft 62 so as to rotate the latter and roller 61. Thus it will be seen that the belt conveyor 53 is driven by frictional engagement with the roller 61. In turn, the movement of belt conveyor 53 causes rotation of roller 64 which is utilized to drive another part of the mechanism to be later referred to. Either of the end rollers 54 and 59, or the center rollers 55 and 57 may be adjustably mounted to control the tension of the belt conveyor 53 in conventional manner.

For the sake of clarity, the bottles carried by the device have been omitted in Figs. 1 and 2, but it will be understood that crates 77 with bottles therein are adapted to enter the machine at the top of the inclined portion of the conveyor and are carried down the incline during the upper run of the conveyor. Before the crates reach the bottom of the inclined portion of the conveyor, the bottles are removed therefrom as will be later explained, and the empty crates continue down the incline and across the upper horizontal run of the conveyor to the rear end of the machine where they may be manually or otherwise taken away from the machine.

As will be more clearly noted from Figs. 1, 3 and 4, a transversely movable L-shaped guide rail 78 extends upwardly and inwardly from each beam 46 and is arranged parallel therewith for a substantial distance along its inclined portion. Each rail 78 is movably secured to one of the beams 46 through the medium of a pair of spaced U-shaped brackets 79 which are welded or otherwise suitably secured to beams 46. Each bracket 79 has a movable rod 79' extending therethrough (see Figs. 3 and 20), with the inner end of each rod being welded to rail 78, while the outer ends thereof have a collar 80 secured to the rod by a suitable set screw. Intermediate its ends, and between the upstanding arms of bracket 79, each rod 79' has another collar 80' secured thereto by a set screw, while a coil spring 81 surrounds the rod with one end of the spring bearing against collar 80' and the other end of the spring bearing against the arm of bracket 79 which is between collars 80 and 80'. Thus transverse movement of each rod 79' and consequently of the rails 78 is permitted to the extent allowed by the spacing of collars 80 and 80', and springs 81 have a normal bias tending to urge the rails 78 toward each other.

The forward end portions of rails 78 are flared outwardly as indicated at 82 to more readily permit the crates 77 with bottles 83 to enter the machine. In their normal positions rails 78 are spaced far enough apart to permit a bottle crate to pass between them, but if the walls of a crate should strike a rail 78, the latter will merely be moved outwardly against the action of springs 81 and no damage will be done. It will be noted from Fig. 3 that bottles 83 are of the size and type that project above the tops of the crates in which they are carried.

Supplementing the guide means for the crates 77 are additional guide means for the bottles 83, which also serve to keep the bottles in proper position in the crates prior to their removal from the crates. As more clearly shown in Figs. 1 and 3, a cross bar 84 is welded or otherwise secured between the beams 27 across their reduced portions 29 inwardly of the front ends of the beams. Adjacent each end, bar 84 has a depending bolt 85 threaded thereto and held by a nut 86, while the lower end of each bolt 85 is formed with an annular socket member 87 which receives an annular shaft 88 secured thereto by set screws 89. Intermediate its ends, shaft 88 has a pair of spaced socket members 90 secured thereto by set screws 91. One member 90 has a channeled guide 92 welded thereto and having depending sides 93 and 94, while the other member 90 has welded thereto a channeled guide 95 having depending sides 96 and 97. These guides 92 and 95 extend parallel with guide rails 78 for a distance equal to slightly less than the length of one of the crates 77, as indicated in Fig. 4.

An angular bracket 98 is welded at one end to side 93 of guide 92 and its opposite end carries a small depending roller 99, while a similar angular bracket 100 has one end welded to side 97 of guide 95, with its opposite end carrying a roller 101 similar to roller 99. Between side 94 of guide 92 and side 96 of guide 95, a double bracket 102 is welded and carries a depending roller 103. The arrangement of the rollers 99, 101 and 103, as more clearly shown in Fig. 4, is forwardly of the front ends of the guides 92 and 95, while the proper relative spacing of these rollers and guides with respect to bottles passing into the machine is more clearly shown in Fig. 3. In the latter figure, counting from left to right, it will be seen that the bottles in the first row will have their upper portions pass between roller 99 and the outwardly turned lower end of side 93 of guide 92, the bottles in the second row will pass between the outwardly turned lower end of side 94 of guide 92 and roller 103, those in the third row will pass between the latter roller and the outwardly turned lower end of side 96 of guide 95, while those in the fourth row will pass between the outwardly turned lower end of side 97 of guide 95 and roller 101. Thus, any lateral tilting of the bottles in their crates will be corrected by the respective rollers and guides. It should also be pointed out that the use of set screws 89 and 91 with shaft 88 permits the guides 92 and 95, and the rollers 99, 101 and 103 to be readily arranged at the proper angle with respect to the bottles 83 which obviously will be in inclined position as they start down the inclined portion of the conveyor.

Figure 6A:
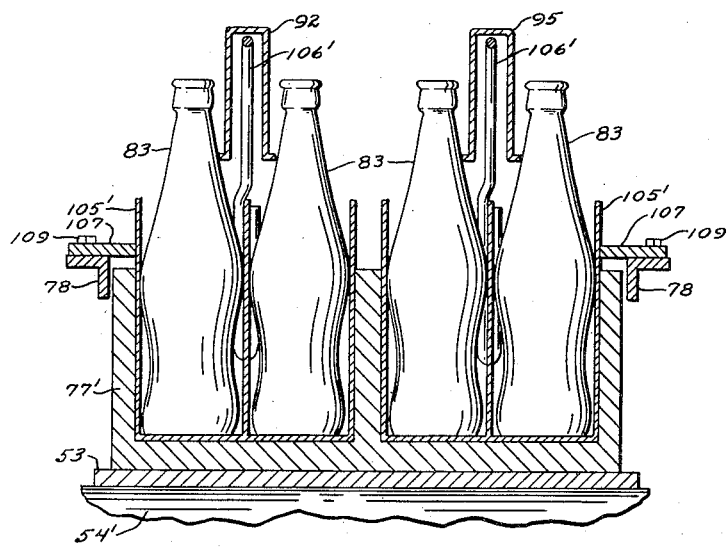

In all the figures of the drawings illustrating crates with bottles therein, except Figs. 5, 6 and 6a, a standard crate containing twenty-four fixed compartments for bottles has been shown. Figs. 5 and 6 show a modified form of crate 77' of the same over-all size as crate 77, having no permanent compartments of bottle size, but which has four equal size larger compartments 104, each of which is adapted to receive one removable six-bottle carrier 105. Four of these carriers 105 fit snugly in a crate, as indicated in Fig. 5, and each carrier has a permanent handle portion 106 that extends above the tops of the bottles, into the channels 92 and 95, while the side walls of carriers 105 extend slightly above the top of crate 77'. Many of such crates and carriers are in use today. It will be observed from Fig. 5 that these handles 106 are located between rows 1 and 2, and between rows 3 and 4 of the bottles in the carriers. In some machines these handles might interfere with proper operation of the mechanism, but with my machine these handles will simply pass between the sides of the guides 92 and 95 and will be out of the way of any moving mechanism.

Since the carriers 105 are intended to be removable from crates of the type like 77', it is possible that these carriers might have a tendency to be lifted from the crates as the bottles are removed from the carriers during their passage through the machine. I provide mechanism to prevent lifting of the carriers from the crates as the bottles are lifted therefrom. Referring to Figs. 4, 5 and 6, the upper portion of each guide rail 78 is provided with an elongated plate 107 that is slightly longer than one-third of the length of a crate 77 or 77'. Each plate 107 is provided adjacent each end with a transverse elongated opening 108 through which a bolt 109 extends for threaded engagement with rail 78 (see Fig. 6). Since openings 108 are larger than the bolts 109 it will be seen that the plates 107 are capable of limited transverse movement with respect to rails 78. To control this transverse movement, one end of a flat spring 110 is suitably secured to each bolt 109, while the other end of each spring 110 is similarly secured to a bolt 111 threaded into plates 107. Each spring 110 is curved slightly and intermediate its ends engages a pin 112 carried by the plates 107. Thus, the springs 110 have a normal bias tending to urge the plates 107 inwardly with respect to rails 78. It will be more clearly observed from Figs. 4 and 5 that each plate 107 is of least width at its forward end, increases gradually in width to approximately its midportion, and then remains of constant width to its rear end. Hence, in their inner positions the forward portions of each plate 107 extend at least over the top of the side walls of crates 77 or 77', while the rear portions of these plates extend over the top of the outer side walls of carriers 105 in crates 77' (see Figs. 5 and 6). In the event bottles in the outer rows should strike plates 107 while passing through the machine, the plates will move outwardly against the action of springs 110 and allow the bottles to pass, but the outward movement of these plates will not be enough to move their rear portions from above the top of the outer side walls of carriers 105, so that it will not be possible to lift these carriers out of the crates 77' while they are restrained by plates 107.

Fig. 6a shows a modified form of carrier 105', also in use today, which is similar to carrier 105 except that the side walls of carrier 105' are higher than the side walls of carrier 105, so that it is not possible for these higher side walls to pass under plates 107. Thus, these higher side walls will merely force the plates 107 outwardly, but carriers 105' will be restrained from lifting out of their crates 77' because the tops of their handles 106' will strike the tops of channels 92 and 95 and prevent any substantial upward movement of carriers 105'.

It is possible that as the bottles are removed from either crates 77 or 77' there may be a tendency for these crates themselves to move upwardly with the bottles. As will be noted from Figs. 4, 5, and 6, the plates 107 will at least partially restrain upward movement of the crates, but it is desirable to have additional means for holding down these crates. As more clearly shown in Figs. 4, 20 and 21, spaced from and on opposite sides of each plate 107, the upper surface of each guide rail 78 is provided with a pair of vertical, spaced, integral ears 107'. Each pair of these ears pivotally receives a bell crank lever 108' intermediate the ends of the latter, with the horizontal arms of the levers 108' directed toward each other as indicated in Fig. 4. Each horizontal arm of the levers 108' carries a roller 109' arranged to lie inwardly of the rails 78 so that these rollers will be in the vertical plane of the outer side walls of crates 77 or 77', as indicated in Fig. 20. A coil spring 110' is connected between the upper ends of the vertical arms of levers 108', and this spring has a normal tendency to pull the upper ends of these vertical arms toward each other. Hence, if no crates were under the rollers 109', the spring 110' will force the horizontal arms of levers 108' downwardly until they engage the upper surface of rails 78, so that the bottom of the rollers 109' will be below the upper surface of rails 78, and in a plane below the longitudinal plane in which lie the upper surfaces of the crates 77 and 77'. Thus, as the top portion of the outer sides of a crate strike the rollers 109', the latter will be raised to allow the crate to pass under the rollers, while the action of spring 110' forcing the rollers downwardly will maintain these rollers in contact with the top of the outer sides of the crate and prevent the crate from moving upwardly as bottles are lifted out of the crate.

Referring now to the bottle handling mechanism of the machine, including the bottle gripping fingers, the latter are clearly illustrated in Figs. 8 to 10 inclusive. Since the present machine is designed primarily to handle crates containing twenty-four bottles arranged four in a row transversely of the crate and six in a row longitudinally of the crate, each bottle gripping unit consists of four tranversely aligned fingers adapted to pick up simultaneously each transverse row of four bottles as the latter pass into position to be engaged by the fingers. It will be apparent, however, that the bottle gripping units may contain more or less than four fingers, if desired.

As shown, each bottle gripping unit is indicated as a whole by the numeral 113 and comprises an elongated channel bar 114 having a pair of spaced, inverted U-shaped members 115 preferably spot welded to bar 114 intermediate the ends thereof and interiorly of its channel. The sides 116 and 117 of each member 115 constitute finger elements fixed with respect to bar 114 having their free ends flanged outwardly as at 118, at an angle of approximately 90°, and members 115 may be additionally flanged inwardly, as indicated in the lower portion of Fig. 8, to strengthen them. Each finger element 116 and 117 is of a width equal to about one and one-half times the diameter of a bottle under its bead portion or under its bulbous neck portion.

Co-operating with each member 115 is a pair of finger elements 119 and 120, movable with respect to bar 114, and being pivotally mounted to the latter bar intermediate their ends. Each finger element 119 and 120 is shaped substantially like a bell crank lever, having a short arm 121 and a long arm 122 bent at an angle to each other which is slightly greater than a right angle, with the free end of each arm 122 being flanged inwardly as at 123, at an angle of approximately 90°.

Each arm 122 is provided adjacent its junction with arm 121 with an elongated transverse opening 124 which pivotally receives a tongue 125 formed integral with bar 114, so that each arm 122 passes through bar 114 and is pivotally connected to the latter (see Fig. 9), to allow movement of finger element 119 and 120 from the position shown in Fig. 9 to that shown in Fig. 10 and vice versa. The manner of connecting each arm 122 with its tongue 125 is best understood from Fig. 9. As shown, bar 114 is first cut transversely on lines 126 and 127, and a portion of the metal is cut out to leave an opening 128. This provides a pair of tabs 129 which are then bent to an angle of about 90° (not shown) with respect to bar 114. Openings 130 are then cut longitudinally in bar 114 to form tongue 125. Arms 122 may now be inserted through bar 114 with tongues 125 extending through openings 124, after which the tabs 129 are bent back to their original position, thus preventing removal of arms 122 from their tongues 125, while permitting limited pivotal movement of each finger element 119 and 120.

Means are provided to control the pivotal movement of each pair of finger elements 119 and 120. As illustrated, finger elements 116 and 117 are provided intermediate their ends with aligned openings 131 through which extend a coil spring 132, the opposite ends of which are suitably secured to finger elements 119 and 120, respectively. Between each finger element 116 and 119, and 117 and 120, a tubular spacer sleeve 133 surrounds the spring 132, and these spacers may be freely mounted on the spring or they may be formed integral with elements 116 and 117. Springs 132 have a normal bias tending to urge elements 119 and 120 toward each other, but because of the position of the spacers 133 this movement toward each other is restricted so that elements 119 and 120 will co-operate with elements 116 and 117 to form a plurality of bottle gripping members. The bottle gripping position of one element 117 and one element 120 is shown in Fig. 10, and the other elements cooperate in the same manner to grip a bottle, as will be understood. By moving arms 121 of the movable finger elements toward bar 114, arms 122 will be moved outwardly, as indicated in Fig. 8, to non-gripping position.

At each of its ends, bar 114 has an angle bracket 134 riveted or otherwise rigidly secured thereto, which bracket has a portion substantially at a right angle with respect to bar 114 that fixedly receives a stub shaft 125 on which is mounted a roller 136. A plurality of bars 114 having their associated finger elements and rollers are connected together in an endless chain arrangement to provide an endless conveyor, indicated as a whole by the numeral 137, for picking up bottles 83 from their crates 77 and 77' near the front end of the machine and carrying the bottles to the rear of the machine. The linkage arrangement forming the chains 138 will be better understood from Figs. 7 and 8. As shown, links 139 are secured in overlapping relation to stub shafts 135 on each side of rollers 136 to provide a continuous chain connected to each end of bars 114.

Near the front end of the machine, bearings 140 are suitably supported on beams 27 and rotatably receive a driven shaft 141. Inwardly of each end of shaft 141 a sprocket wheel 142 is fixed on the latter shaft for rotation therewith, preferably by means of set screws 143, and one of the chains 138 passes around each sprocket wheel with the sprocket teeth engaging between the rollers 136, as indicated in Fig. 7. Each chain 138 also passes around an idler sprocket 144 (see Fig. 1) mounted for rotation on shaft 145 which is fixed in bearings 146 suitably secured to beams 27 adjacent their rear ends. The sprockets 142 may be readily adjusted by manipulating the set screws 143 so as to insure proper transverse positioning of each bar 114 with respect to the chains 138.

As indicated in Fig. 1, chains 138 are driven in a counterclockwise direction by means of a sprocket wheel 147 fixed on one end of shaft 141, which sprocket is rotated by a drive chain 148 that also passes over a sprocket (not shown) on drive shaft 73, which is arranged on the latter shaft inwardly of sprocket 74. During the lower run of conveyor 137, chains 138 are supported on L-shaped bars 149 (see Figs. 2 and 7) welded or otherwise secured to the inner faces of beams 27, which bars extend parallel with beams 27 and terminate near each sprocket 142 and 144. During the upper run of conveyor 137, chains 138 are supported on L-shaped bars 150, coextensive with bars 149 and in vertical alignment therewith. Bars 150 are welded or otherwise secured to transverse bracing members 151 arranged at selected intervals under the bars 150, which members 151 are in turn welded to the upper ends of vertical supports 152, the lower ends of which are welded or otherwise suitably secured to beams 27.

Keyed on shaft 141 in spaced relation is a pair of cam rollers 153 (see Fig. 8) of approximately the same diameter as sprocket wheels 142. At the time chains 138 complete their upper run and start around the sprockets 142, each of the rollers 153 is in the path of movement of one set of the movable finger elements 119 and 120, so that as each roller 153 engages each pair of short arms 121, the latter are moved inwardly to open the bottle gripping fingers as shown in the upper portion of Fig. 8. As successive pairs of gripping fingers contact the rollers 153, the fingers will be opened, and each pair of gripping fingers remain in open position while it moves through an arc of about 180°. As soon as the chains 138 leave sprockets 142 and start their lower run, the arms 121 of each pair of gripping fingers will move out of engagement with rollers 153 and springs 132 will move the gripping fingers to closed position.

As will be more clearly observed from Figs. 7 and 8, before the gripping fingers move out of engagement with rollers 153, a plurality of the bottles 83 will move into the path of said fingers, so that as the fingers close, the end portions 118 and 123 of the fingers will engage the bottles below the bulbous neck or "reinforcement" on each bottle. Since the path of movement of the gripping fingers after they engage the bottles is substantially horizontal, and the path of movement of the crates carrying the bottles is down an incline of about 23° with respect to the horizontal, it will be apparent that the bottles will be removed from the crates as the latter and the fingers continue to move in their respective directions. In Fig. 7 it will be noted that as the bottles are initially gripped by the fingers, the bottles are at an angle of about 23°. Then as the bottles are lifted, their angle gradually decreases until the bottles are held upright after they clear the tops of the crates.

It is to be further noted that if a selected transverse row of bottles happens to be in proper alignment with a selected transverse row of fingers as the latter are ready to pick up such bottles, said row of fingers will readily hold such bottles and remove them from the crate, as indicated at the right side of Fig. 7. If, however, the alignment of a selected row of bottles with a selected row of fingers is improper for the latter to pick up the bottles without assistance, the proper operation of the machine will not be affected, since the next following row of fingers will quickly cooperate with the selected row of fingers and the bottles will be picked up and carried between the two rows of fingers, as is also indicated in Fig. 7. This feature of the invention is accomplished by relatively close longitudinal spacing of the rows of fingers so that any two of the rows will cooperate to engage the bottles, if necessary, before the bottles can pass out of the zone where it is possible for them to be engaged by the fingers. Thus, it is highly improbable, if not impossible, for any bottle to escape being picked up by the fingers.

After the bottles 83 are picked up from their crates they are carried toward the rear of the machine, or toward the right as viewed in Figs. 1, 7 and 12. Since the bottles are engaged beneath their "reinforcements" by the fingers, upon release from the fingers they would have to drop a distance at least equal to the distance from the "reinforcement" to the top of the bottle, in order to drop clear of the fingers. It has been found that a drop of such distance is undesirable, since many of the bottles do not remain upright, but fall over and interfere with other bottles. To shorten this distance the bottles would ordinarily have to drop from the fingers, I provide mechanism which permits the bottles to preliminarily drop a part of their distance before they are finally dropped from the fingers.

As best shown in Figs. 1, 11 and 12, a pair of spaced idler rollers 154 are arranged in the path of travel toward the rear of the machine of arms 121 of the gripping fingers. Rollers 154 are mounted for rotation with a shaft 155, the reduced ends of which are journaled in depending brackets 156 secured at 157 to cross frame members 158, which in turn are welded or otherwise secured to the upper surfaces of beams 27. Each roller 154 is arranged whereby when a set of gripping fingers 119 and 120 engages one of the rollers, the arms 121 of the fingers will be depressed to open the fingers and permit the bottles to drop downward.

The bottles are permitted to drop a predetermined distance where they are received on a small longitudinal conveyor, indicated as a whole by the numeral 159. The conveyor 159 is formed of four spaced chain members 160 having relatively small links, each chain member being wide enough to receive a bottle 83, as indicated in Fig. 11. Chain members 160 are driven by sprockets 161 mounted for rotation on a large driven shaft 162, the reduced ends of which are journaled in depending side plates 163 secured as at 164 to the longitudinal frame members 25 and 25'. One end of shaft 162 extends outwardly of frame member 25' and has a drive sprocket 165 secured thereto, which receives a drive chain 166 that also passes around a sprocket 167 carried on the end of shaft 65, so that shaft 162 and the chain members 160 may be driven by frictional engagement of the roller 64 on shaft 65 with the conveyor belt 53. The chain members 160 pass over a horizontal table or support 168, which is secured as at 169 to inwardly extending flanges on the upper end of side plates 163, and around idler sprockets 170 mounted for rotation on a shaft 171 fixed between the side plates 163.

The upper run of the chain members 160 is in the same direction and at the same speed as the lower run of the bottle gripping fingers, and this run of each chain member is for a distance which will allow about three bottles in longitudinal alignment to be received thereon. The use of the table 168 over which the chains pass insures proper planar alignment of the bottles, and the latter are permitted to drop only a distance sufficient to permit the gripping fingers to re-engage the bottles under their "lip" portions. This reengagement of the gripping fingers under the "lip" portions of the bottles will take place as soon as the fingers pass beyond the rollers 154 and before the bottles reach the rear end of conveyor 159, as indicated in Fig. 12.

After the bottles pass conveyor 159 they are carried by the gripping fingers to positions above a conveyor, indicated as a whole by the numeral 172. The latter conveyor moves substantially at a right angle to the gripping fingers and under the latter, and each longitudinal row of bottles is discharged from the fingers onto conveyor 172 at a different discharge station, so that the bottles discharged from one longitudinal row will not interfere with those from another row either at the time of discharge or as the bottles move with conveyor 172.

As more clearly shown in Figs. 1 and 14, three spaced transverse bars 173, 174 and 175 are suitably secured between the beams 27, above the conveyor 172. Viewing the longitudinal rows of bottles as carried by the gripping fingers in Fig. 14, from right to left we will call the four rows A, B, C and D. A longitudinal roller carrying arm 176 has one end secured to bar 174, is secured intermediate its ends by a screw 177 to bar 173, and its opposite end is bifurcated to rotatably receive a roller 178. The latter roller is arranged above row A of the bottles (see Fig. 13) in the path of travel of the arms 121 of the movable finger elements 119 that co-operate with finger elements 116 to carry the bottles in row A, and as each of these arms 121 engages roller 178 it is depressed to release its bottle and permit the latter to drop onto conveyor 172. Thus, roller 178 in effect constitutes a discharge station for the bottles in row A, since these bottles are successively discharged from the gripping fingers as they pass under roller 178. As soon as the bottles are received on conveyor 172 they pass with the latter in row A' toward the left as viewed in Fig. 13 and toward the right as viewed in Fig. 14.

The discharge station for the bottles in row B comprises a roller 179 mounted in the bifurcated end of a carrying arm 180, the opposite end of which is secured to bar 175, while a screw 181 secures this arm intermediate its ends to bar 174. Roller 179 is arranged in the path of travel of arms 121 of the movable finger elements 120 that co-operate with finger elements 117 to carry the bottles in row B, and the bottles in the latter row are successively discharged from the gripping fingers as they pass under roller 179 onto conveyor 172, on which they travel in row B'. It will be noted from Fig. 14 that roller 179 is spaced rearwardly of the machine from roller 178 a sufficient distance to prevent interference between the bottles of rows A and B as they are discharged and as they travel on conveyor 172 in their respective rows A' and B'.

Similarly, the discharge station for the bottles in row C comprises a roller 182 mounted in the bifurcated end of a carrying arm 183, the other end of which is secured to bar 173, while a screw 184 secures this arm intermediate its ends to bar 174. Roller 182 is arranged in the path of travel of arms 121 of the movable finger elements 119 that co-operate with finger elements 116 to carry the bottles in row C, and the bottles in the latter row will be successively discharged from the gripping fingers as they pass under roller 182 onto conveyor 172, on which they travel in row C'. Roller 182 is spaced rearwardly of the machine from roller 179 about the same distance that the latter is spaced from roller 178. Hence, there will be no interference between the bottles of rows A, B and C as they are discharged and as they travel on conveyor 172.

Likewise, the discharge station for the bottles in row D comprises a roller 185 mounted in the bifurcated end of a carrying arm 186, the opposite end of which is secured to bar 174, while a screw 187 secures this arm intermediate its ends to bar 175. Roller 185 is arranged in the path of travel of arms 121 of the movable finger elements 120 that co-operate with finger elements 117 to carry the bottles in row D. As roller 185 depresses the arms 121 to release the bottles in row D in the same manner that the bottles are released by rollers 178, 179 and 182 in rows A, B and C, respectively, the bottles in row D will be successively discharged from the gripping fingers as they pass under roller 185 onto conveyor 172, on which they travel in row D'. Roller 185 is spaced rearwardly of the machine from roller 182 about the same distance that the latter is spaced from roller 179, so that there will be no interference between the bottles in one row with those in any other row either as they are discharged or as they travel on conveyor 172.

Conveyor 172 comprises an endless belt 188 that travels clockwise as viewed in Fig. 2. It passes around a large driven roller 189 mounted on a shaft 190, then over an idler roller 191 mounted for rotation between the I-beam sections 39, then around an idler roller 192 mounted for rotation between the I-beams 36 and 37, then across the upper surface of a horizontal table or support 193 that is welded or otherwise suitably secured between the I-beams 36 and 37, then around an idler roller 194 mounted for rotation between the I-beams 36 and 37, then over an idler roller 195 mounted for rotation between the I-beam sections 39, and back to its starting point on roller 189.

Shaft 190 is mounted between the free ends of a pair of spaced arms 196 (one of which may be seen in Fig. 2), the opposite ends of which are pivoted at 197 to spaced vertical frame members 198 (one shown in Fig. 2) suitably secured between longitudinal frame members 25 and 26. Also secured between frame members 198 is a vertical plate 199 that carries a motor 200 and a gear reduction unit 201. A shaft 202 driven by the motor, carries a sprocket wheel 203 that engages a drive chain 204 which also engages a larger sprocket wheel 205 secured on shaft 190, so that the latter shaft and roller 189 may be driven by motor 200. The arrangement is such that the belt 188 supports the roller 189 in proper position to drive the belt, and at the same time the weight of the roller, shaft 190, arms 196, chain 204 and sprocket 205 will properly tension the belt.

Even though the distance the bottles are required to drop from the gripping fingers to conveyor belt 188 has been reduced by preliminarily dropping the bottles on conveyor 159 so that they are engaged by the fingers under the "lip" instead of under the "reinforcement" of the bottles, it has been found that if the movement of belt 188 is in a true horizontal plane transversely of the moving gripping fingers and bottles at the time the latter are dropped, there is a tendency for some of the bottles to tilt and even to fall over upon engagement with belt 188. Since the upper run of belt 188 is clockwise as viewed in Fig. 2, the movement of this belt when truly horizontal, upon engagement by some of the bottles, moves the bottoms of such bottles faster than the tops thereof in the direction the belt is moving, thus causing the bottles to tilt or fall backward in the opposite direction from that in which the belt is moving.

To overcome this tendency of the bottles to tilt or fall upon contact with belt 188, I provide a slightly slanting area on belt 188 directly under each of the bottle discharge rollers 178, 179, 182 and 185. In Fig. 23 I have shown a part of the frame of conveyor 172 with belt 188 and table 193 removed. This part of the frame includes a plurality of spaced L-beams 206 connected transversely of the frame to I-beams 36 and 37, and a plurality of spaced, longitudinal L-beams 207 suitably secured to beams 206. Journaled between I-beams 37 and the first L-beam 207 (viewed from the right in Fig. 23) is a shaft 208 that has fixed thereto an adjustable ramp member 209, the free end of which extends toward roller 192 and is preferably slightly curved, as indicated in Fig. 22. The outer end of shaft 208 extends through an integral collar 210 formed on beam 37, and a set screw 211 extends through this collar for engagement with shaft 208 to hold the latter and the ramp in the desired angular position. The outer end of shaft 208 may be squared to receive a tool for turning this shaft. Ramp 209 is located directly under discharge roller 185.

Directly under discharge roller 182 is an adjustable ramp member 212, identical with member 209, fixed at one end on shaft 213 that is journaled between I-beam 37 and the L-beams 207 which is third from the right in Fig. 23. The outer end of shaft 213 extends through an integral collar 214 on beam 37 and has a set screw 215 co-operating therewith to hold ramp 212 at the desired angle.

Similarly, an adjustable ramp member 216, identical with members 209 and 212, is located directly under discharge roller 179, and has one end fixed to a shaft 217 that is journaled between I-beam 37 and the L-beam 207 which is fifth from the right in Fig. 23. The outer end of shaft 217 extends through an integral collar 218 on beam 37 and has a set screw 219 associated therewith to hold ramp 216 at the desired angle.

Also, directly beneath discharge roller 178 is an adjustable ramp member 220, similar to the other three ramp members, that has one end fixed to a shaft 221 which is journaled between the I-beams 36 and 37. Beam 37 has an integral collar 222 thereon which receives one end of shaft 221, and a set screw 223 co-operates therewith to hold ramp 220 at the desired angle.

In order to provide slanting areas on the belt 188 by the use of ramps 209, 212, 216 and 220, it is necessary to tilt the ramps at an angle to allow the free ends thereof to extend above the upper surface of table 193. This is accomplished by providing a substantially rectangular opening 224 (one of which may be seen in Fig. 22) in the table 193 for each of the ramps, through which openings the ramps are tilted, as indicated in Fig. 22, and locked in proper position by means of the set screws. The angle at which the ramps extend may be changed to suit the size of bottle passing through the machine, and with the conventional six-ounce bottle it has been found that in most instances a suitable angle will be obtained if the free end of each ramp is raised about one-eighth of an inch above the plane of the upper surface of table 193. After release from the gripping fingers, the bottles will fall on the slanting areas of belt 188 in about the position shown in Fig. 22 and any tendency for the bottles to tilt or fall backwards will be overcome by the slant of the belt, so that the bottles will move in proper upright position with the belt as they leave the slanting areas.

As more clearly shown in Figs. 1 and 15, a side rail 225 is secured to I-beam 36, parallel therewith, by means of angle brackets 226, so that the lower edge of rail 225 is just over one edge of belt 188 and is spaced slightly above the latter so as not to interfere with movement of the belt. Rail 225 extends from a point adjacent the end of roller 194 to a point adjacent to but clear of interference with row A of the bottles being carried by the gripping fingers. A similar, but slightly longer side rail 227 is secured to I-beam 37 by means of angle brackets 228, so that the lower edge of rail 227 is just above the other edge of belt 188. A pair of spaced bars 229 extend across belt 188 above the tops of the bottles being carried by the belt, and are welded to the upper ends of brackets 230 which in turn are welded to the side rails 225 and 227.

Between and parallel to the side rails 225 and 227, are arranged a plurality of equally spaced, alternately short and long guide rails 231 and 232, respectively, which guide rails are about the same width as side rails 225 and 227. The spaces defined by the guide rails 231 and 232 are slightly wider than the largest diameter of the bottles which will pass between the guide rails. In this instance the guide rails 231 and 232 are secured in proper position by means of rods 233, the lower ends of which are welded to the upper edges of the guide rails, while their threaded upper ends extend through openings in bars 229 to which they are held by nuts 234. The lower edges of the guide rails 231 and 232 are spaced just above the belt 188 so as not to interfere with movement of the latter, and the outer ends of these guide rails extend to a point adjacent the end of roller 194, as indicated in Fig. 15.

In front of each short rail 231, a small agitating plate 235 is arranged. These plates 235 are fixed to a transverse shaft 236 extending above the tops of the bottles moving with belt 188, which shaft is journaled for rocking movement in bearing brackets 237 welded on the upper surface of I-beams 36 and 37. As more clearly shown in Fig. 24, one end of shaft 236 has an arm 238 fixed thereto for rocking movement from its full line position to its broken line position and vice versa, which movement is obtained through conventional crank and eccentric mechanism 239 operated from shaft 240 of roller 194. Thus, plates 235 are continuously agitated to a limited extent in front of guide rails 231 while the belt 188 is in motion.

It is believed to be apparent that as the bottles move on belt 188 in their respective rows A', B', C' and D' from the bottle discharge stations, they will come into contact with the front edge of guide rails 232 and pass to each side thereof and into the spaces between the guide rails 231 and 232, as well as between the guide rails and the side rails 225 and 227. The bottles will also contact the front edges of the agitating plates 235, which will prevent jamming of the bottles at the entrances to the spaces between the guide rails, and at the same time permit the bottles to pass by each side of these plates. In the event a bottle jam of serious proportions should occur at the entrance to the guides and the bottles pile up in front of the guides, one of the bottles will eventually contact an arm 241 of a microswitch 242, which is connected by conventional means to motor 71, and movement of arm 241 will shut off motor 71, thus stopping further movement of the bottle gripping fingers and the crate conveyors until the jam has been cleared.

In the normal operation of the machine, however, the bottles will be delivered by belt 188 in parallel rows to a washing machine or other apparatus, indicated by the letter W.

As long as the bottles are upright in their crates when they enter the machine, the crates with bottles therein will pass from a feed-in conveyor, indicated by the letter X in Fig. 1, and which may be manually or otherwise operated, down the inclined conveyor 43. As the bottles pass into the path of travel of the gripping fingers they will be picked up and carried by the fingers to be discharged by the latter upon conveyor 72, which in turn will carry the bottles to a washing machine or other apparatus. At the same time the empty crates will be carried out of the way. The operation of the machine under normal conditions is continuous from the time the crates with their bottles start down the inclined conveyor 43 until the bottles are delivered to the washing machine and the empty crates are carried away. It has been found that best results are obtained if the conveyors that are driven from motor 71, namely the crate and bottle conveyor 43, the finger carrying conveyor 137, and the small bottle conveyor 159, are operated at uniform speeds, and a satisfactory speed has been determined to be about five feet per minute. It is preferred, however, that conveyor 172, operated from motor 200, be driven at a slightly higher speed of about six feet per minute.

In order to prevent the entry into the machine of any upside down bottle that might happen to be in one of the crates, I provide safety mechanism which will stop the motor 71 before such bottle can damage the machine. As best shown in Figs. 16, 17, 18 and 19, a shaft 243 is mounted for turning movement between the inclined portions 29 of beams 27 adjacent the upper ends thereof, and this shaft has a pair of threaded rods 244 fixed thereon in spaced relation, said rods being offset forwardly of this shaft. Rods 244 are secured to shaft 243 by a coupling 245 having an opening therethrough which fixedly receives shaft 243, and having another opening perpendicular to the first opening through which the rods 244 extend. Locking and adjusting nuts 246 are utilized to properly secure rods 244 to the couplings 245.

The lower ends of rods 244 are welded to the top 247 of a safety member, indicated as a whole by the numeral 248, which has a plurality of vanes or blades 249 welded to the top 247 and depending therefrom. As more clearly shown in Figs. 16 and 19, vanes 249 are arranged in opposite diagonal formation to provide four tapering passages 250 which are widest at their front ends and narrow at the rear. The width of passages 250 is such that the top of a bottle passing through in upright position will readily pass through the narrowest part of the passages, but an upside down bottle will not go through and will become lodged in the passages.

One of the end vanes 249 has an elongated bar 251 welded thereto and depending to a position just above the center of one of the guide rails 78. Normally the lower end of bar 251 rests on the inclined end surface 252 of a locking dog 253, the other end of which is pivoted at 254 between a pair of spaced ears 255 formed on rail 78. Dog 253 is provided with a notch 256 intermediate its ends, and a projection 257 on the dog, receives one end of a coil spring 258, the opposite end of which is secured to a bracket 259 carried by rail 78. Spring 258 has a normal bias tending to urge the free end of dog 253 upwardly, but the engagement of bar 251 with the free end of the dog prevents movement of the latter while these parts are in the position shown in Fig. 17.

The top of each rod 244 has one end of a coil spring 260 secured thereto, while the opposite end of each spring is secured to a bracket 261 carried by the inclined portions 29 of beams 27. Springs 260 have a normal bias tending to pull the upper ends of rods 244 toward the brackets 161 and to move the lower ends of rods 244 and the safety member 248 forward. However, a stop bar 262, welded between the inclined portions 29 of beams 27, prevents forward movement of rods 244 and safety member 248 beyond the position shown in Fig. 17. Shaft 243 also carries a cam roller 263 having a notch 264 in its outer periphery that receives the outer end of a switch arm 265 of a microswitch 266 carried on one of the beam portions 29, which switch is connected in conventional manner to the motor 71 to stop the latter and the mechanism operated thereby whenever the switch arm 265 is out of the notch 264 and is merely riding on the outer surface of roller 263.

Figure 17:
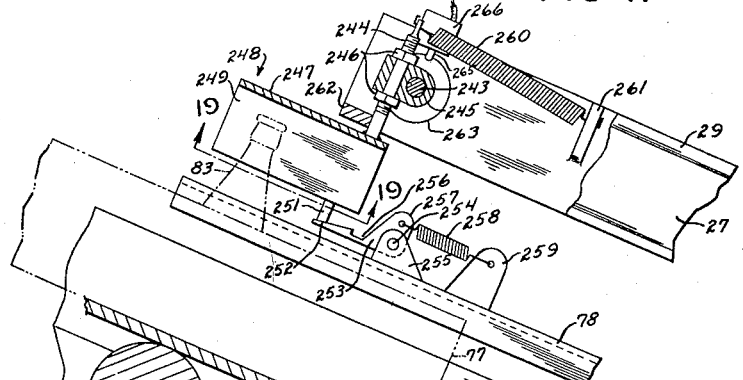
Fig. 17 is a section taken substantially on line 17—17 of Fig. 16.
Figure 18:
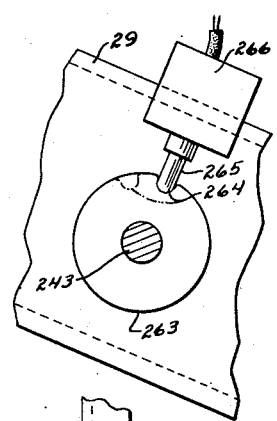
Fig. 18 is a fragmentary section taken substantially on line 18—18 of Fig. 16.
Figure 19:
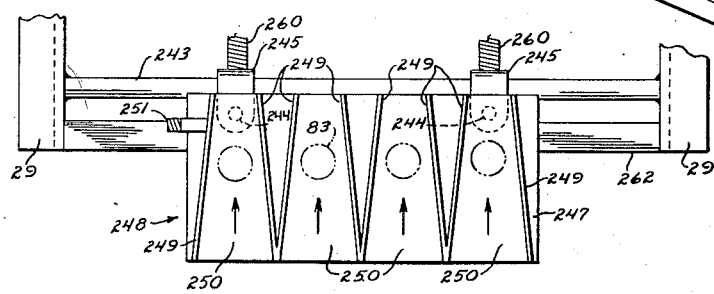
Fig. 19 is a similar section taken substantially on line 19—19 of Fig. 17.

With the parts of the safety mechanism in the position shown in Fig. 17, bottles in upright position in their crates will readily pass through the passages 250 in the safety member 248, and even if the top of one or more of the bottles should strike the sides of vanes 249, the latter will merely guide the bottles through the narrow end of the passage. If, however, an upside down bottle in one of the crates should attempt to go through one of the passages 250, the bottom of the bottle is too wide to pass through and will jam the passage, so that continued movement of the bottle in attempting to get through the passage will cause the safety member 248 and rods 244 to turn rearwardly with shaft 243. This turning movement of shaft 243 will also turn cam roller 263 so that switch arm 265 moves out of notch 264 and operates the microswitch 266 to shut off motor 71 and stop the conveyor 43 and other parts operated by the motor. Thus no damage can be done to the machine by the upside down bottle.

At the time safety member 248 is moved rearwardly, the locking bar 251 will move with it, causing the lower end of this bar to ride up the inclined end surface 252 on dog 253 and into the notch 256. As long as bar 251 remains in notch 256, the safety member 248 and the cam roller 263 cannot return to their original positions and motor 71 cannot be started. Since spring 258 will hold bar 251 in notch 256 until the bar is manually removed from the notch, it will be apparent that the motor 71 cannot be started again by merely removing the upside down bottle, but that the bar 251 must also be manually removed from notch 256, after which the springs 260 will return the parts to their original or normal position in Fig. 17, with the micro switch open again so that the machine may continue in operation. It will be noted from Fig. 4 that the locking dog 253 and its notch 256 are as wide as the upper surface of the rail 78, while the bar 251 is normally above the center of said rail. Thus, even if this rail 78 should be moved outwardly by one of the bottle crates, the rail movement will not be sufficient to prevent bar 251 from entering notch 256 if an upside down bottle should attempt to enter the machine.

While I have illustrated and described the preferred embodiment of my invention, it will be apparent to those skilled in the art that the invention is not limited to this embodiment and modifications and changes may be made therein without departing from the spirit of the invention or from the scope of the subjoined claims.

What is claimed is:

1. In a machine of the character described, the subcombination of a movable conveyor having bottle engaging members thereon, and means for operating said members to engage and release bottles, said members comprising a transverse bar, a pair of spaced finger elements fixed at one end to said bar, a pair of movable finger elements pivoted intermediate their ends to said bar on opposite sides of said fixed finger elements, the arrangement being such that each movable finger element co-operates with one of the fixed finger elements to hold a bottle therebetween, a common means normally urging both of said movable finger elements simultaneously toward said fixed finger elements, and spacing means to restrain movement of said movable finger elements toward said fixed finger elements beyond a predetermined point.

2. Bottle engaging members comprising a transverse bar, a pair of spaced finger elements fixed at one end to and depending from said bar when in operative position, a pair of movable finger elements pivoted intermediate their ends to said bar on opposite sides of said fixed finger elements, the arrangement being such that each movable element co-operates with one of the fixed finger elements to hold a bottle therebetween, a common means normally urging both of said movable finger elements simultaneously toward said fixed finger elements, and spacing means to restrain movement of said movable finger elements toward said fixed finger elements beyond a predetermined point.

3. A construction of the character referred to in claim 2 wherein said movable finger elements comprise bell crank levers, and said common means comprises a spring.

4. Bottle engaging members comprising a transverse bar, a pair of spaced finger elements fixed at one end to said bar and having their free ends flanged outwardly at approximately a right angle, a pair of movable finger elements pivoted intermediate their ends to said bar on opposite sides of said fixed finger elements and having end portions flanged inwardly at approximately a right angle, the arrangement being such that the flanged end portion of each movable finger element cooperates with the flanged end of one of the fixed finger elements to hold a bottle therebetween, a common means normally urging both of said movable finger elements simultaneously toward said fixed finger elements, and a spacer arranged between each fixed and movable finger element to limit movement of said movable elements toward said fixed finger elements to a distance no greater than the length of said spacers.

5. Bottle engaging members comprising a transverse bar, a pair of spaced finger elements fixed at one end to said bar and having their free ends flanged outwardly at approximately a right angle, a pair of movable finger elements pivoted intermediate their ends to said bar on opposite sides of said fixed finger elements and having end portions flanged inwardly at approximately a right angle, the arrangement being such that the flanged end portion of each movable finger element cooperates with the flanged end of one of the fixed finger elements to hold a bottle therebetween, a coil spring connected between said movable finger elements and having a normal bias tending to urge both of said movable finger elements simultaneously toward said fixed finger elements, said latter elements having aligned openings therein through which said spring passes, and a spacer arranged between each fixed and movable finger element to restrain movement of said movable elements toward said fixed finger elements to a distance no greater than the length of said spacers.

6. A structure of the character defined in claim 5 wherein said spacers comprise tubular sleeves surrounding said spring.

7. A structure of the character defined in claim 5 wherein said movable finger elements comprise substantially bell crank levers, and wherein means are provided to engage and pivot said levers to move said movable finger elements against the action of said spring to release a bottle held between said fingers.

References Cited in the file of this patent

UNITED STATES PATENTS

| | | |
|---|---|---|
| 2,213,774 | Taylor | Sept. 3, 1940 |
| 2,401,679 | Bradley et al. | June 4, 1946 |